United States Patent Office 3,552,130
Patented Jan. 5, 1971

1

3,552,130
METHOD OF FORMING A SUBSTANTIALLY
LIQUID IMPERVIOUS WALL IN AN EARTH
FORMATION
Richard E. Landau, 717 Cornwell Ave.,
West Hempstead, N.Y. 11552
Filed Oct. 28, 1966, Ser. No. 590,217
Int. Cl. E02d 3/12, 3/14
U.S. Cl. 61—35
12 Claims This application is a continuation-in-part of my application U.S. Ser. No. 293,190, filed July 5, 1963, now abandoned.

This invention relates to a method of injecting chemicals into soil to form a substantially liquid impervious wall and other controlled changes within earth formations contaning segments of low horizontal or vertical permeability as is normally exhibited by plastic soils or plastic soils interspersed with other soil types. Plastic soils are those soils which contain sufficient silt or clay particles to have a measurable plasticity index and which generally undergo a reduction in permeability when subjected to remolding.

This invention also relates to a method of creating a liquid impervius zone or zones in soil wherein the chemical reactants, reagents, and other substances are included partially or entirely in backfill material, or added in part or entirely to the backfill material, wherein the backfill of a controlled quality is placed in cavities formed in the soil in a manner to form the impervious zone or zones, in order to attain the required degree of imperviousness.

In the construction of subterranean foundations or other structures, it is often necessary to do the construction in the dry by enclosing in part or whole in the area embraced by the foundation or structure with a liquid-impermeable wall to reinforce the soil and minimize infiltration of liquid from the formation continguous to the area. In the past, one practice has been to drive metal sheeting into the formation and form the wall thereby. Another past practice has been to form overlapping or abutting concrete piles along the periphery of the area to be excavated. The foregoing has been utilized with and without the removal of liquid that may infiltrate into the area. Wellpoints, which lower the water table have been used to control infiltration.

I have found a substantially simpler and more economical manner of forming a liquid-impervious wall within earth formations containing silt and clay size particles.

Broadly, the method for forming the impervious wall comprises helically cutting a plurality of substantially contiguous cavities into the soil to the desired depth, removing the soil traversed by the cutting and backfilling the cavities so formed, and intruding chemicals into the surrounding soil if desired, with a composition that is, or is convertible to, a water impervious state, hereinafter referred to as "wall material." The spacing of the cavities will depend in part upon the extent to which formation liquid can be tolerated within the walled area but having determined the amount of leakage that is tolerable the spacing will be determined by the permeability of the soil surrounding the cavities and the degree the wall material will penetrate into said soil. It is a feature of this invention that penetration into the soil or flow from the soil to the cavity is enhanced by following the cavity forming technique of this formation for reason that said

2 technique affords a method of forming the cavities without adversely affecting the natural permeability of the soil. In one embodiment the wall is formed by introducing into spaced cavities a water impervious material, such as water-guar gum compositions with other additives and filler materials, such as sand, for example, to the desired depth and thickness. Another type of wall-forming material involves the use of water absorbing and expansive material such as bentonite or other volcanic clays. This type of material will generally not penetrate to any substantial extent into the soil. Other materials that can be used for the purpose will be evident to those skilled in the art.

In another embodiment, the wall is formed by introducing into the soil chemicals which either absorb or displace the formation liquid, gel or react with other chemicals introduced into the soil, or react with the chemical composition of the soil particles themselves. Where soil particle sizes permit, bituminous emulsions have been used to displace the liquid in the soil thereby filling the soil voids and reducing the permeability of the soil formation. The Joosten Process is an example of the use of chemical reagents to solidify the soil and at the same time render it impermeable to water. The chemicals in this instance are introduced separately. The process involves a suitably diluted solution of silicate of soda followed by a strong solution of calcium chloride reacting to form a silica gel. More recently phosphoric acid has been used with clay as a waterproofing agent to effect a strengthening of the soil and concomitant effect of rendering the soil impermeable. The phosphoric acid has been found to react with the chemical composition of the clay particles thereby eliminating the need for the introduction of a second stage chemical reagent as in the Joosten and other similar processes.

This invention may be practiced substantially within the confines of the cavity formed. In this manner, the cavity is formed in the desired segment or segments of the earth formation and backfilled with permeable material of controlled quality and character to permit penetration of appropriate chemical solutions, reactants, reagents and other materials to achieve the required reaction to render the backfill substantially impervious. In many procedures the chemicals involved have a short and controllable reaction time to develop the required degree of impermeability. The Joosten process uses viscous chemical solutions, and the most desirable backfill material for this process involves the use of granular soil similar to beach sand. Where a flowing groundwater condition exists, such as may occur in gravelly soils, it is often difficult to place the reagents in the soil without having the reagents washed away prior to the reaction time required for rendering the soil impervious. In such instances columns of finer grained material would be installed within the soil, having a sufficiently low permeability to retain the reagents long enough to permit the reaction to occur.

Certain types of materials, such as guar gum which is a hydrocolloid, are not readily washed through sandy backfill materials as such materials expand on taking on water; therefore, such materials can be mixed with the backfill material in advance of placement into the cavity to develop the impervious zone. Where more than one chemical reactant or reagent is used to control the reaction time in forming the impervious zone, at least one of the chemicals may be placed with the backfill material, if desired, and the remaining chemicals added subsequently.

In the first embodiment the barrier is formed essentially within the limits of the dimensions of the spaced columns introduced into the earth formation. In this instance the wall is formed by creating a plurality of cavities in juxtaposition or overlapping each other, and backfilling the cavities with the water-impervious compositions or with compositions which react to become impervious. Such reactions may be effected by chemical additives. Preferably, the reaction is triggered by the infiltration of the earth formation liquid into the cavity such that the result will produce the desired impermeability and strength effects. The individual cavities forming the wall are preferably formed by helically cutting into the earth formation to the desired depth, removing the earth traversed by the helical cutting and backfilling the cavity, prior to its collapse or otherwise distorting, with the desired composition. By helically cutting, the displacement of the subsoil can be controlled and minimized, and the periphery of the formed cavity can be formed with a minimum of smear and remolding as well as a minimum of disturbance to other previously installed columns. In this manner the periphery will also have the minimum resistance to the passage of liquid into the cavity from the earth formation regardless whether the liquid is in the formation originally as part of the earth composition or whether it was subsequently introduced. In this embodiment it is not essential that the individual cavities have intercepting circumferences. Depending upon the quantity of water infiltration that can be tolerated within the area, the wall can be more or less continuous, i.e., if some leakage into the area excavated can be tolerated then the columns can be spaced to permit such infiltration. Such cavities can also be formed below the depth of the floor of the area to be excavated to strengthen or render the bottom of the excavation impermeable in a manner similar to the walls of the excavation.

The second embodiment is similar to the first in that the cavities are formed in a similar manner; however, inasmuch as the chemicals and other materials are introduced into the earth formation to a point beyond the limits of the cavity formed, the number of columns introduced into the soil in this instance is reduced. Thus, the dimensions of the impermeable wall are not limited to the dimensions of the column, but rather to the distance that the materials can penetrate into the formation. By helically cutting into the soil, the periphery of the cavity will offer the minimum of resistance to the passage of the chemicals, thereby permitting a more extensive penetration of the materials into the earth formation and minimizing the number of penetrations required to produce the desired effect in any area.

Inasmuch as the water barrier is often for the purpose of excavating an adjacent area, the barrier is ultimately subjected to lateral straining forces due to the unbalance effected by the removal of both soil and water in the excavated area. In this instance a plastic barrier will be able to tolerate considerable strain without loss of effectiveness as compared to a rigid mixture which would fracture if overstressed. On the other hand a rigid barrier would be able to take a greater stress differential prior to deflection which in some instances may be desirable. The type of mixture employed, and the embodiment of the invention used will depend upon the specific needs of each individual project.

Backfilling of the cavity may be simultaneous as the cavity is formed, or subsequent thereto. In the second embodiment of the invention the physical backfilling of the cavity, after injection of the desired chemicals into the subsoil may involve untreated materials as this portion will be effectively surrounded by impermeable material. Where the chemicals permeating the soil are to improve soil strength only, the cavity backfill can be solely for waterproofing. An apparatus found useful for penetrating into the earth, removing the earth so traversed and simultaneously backfilling the cavity is described in U.S. application Ser. No. 246,411, filed Dec. 21, 1962.

I claim:

1. The method of forming a liquid impervious wall-like zone within an earth formation comprising backfilling a plurality of cavities by cutting into the formation, establishing at least a portion of said cavities with a substantially sandy wall forming filler material; and introducing into said cavity limits at least a second material to coact with said filler material to form said liquid impervious wall-like zone.

2. The method of claim 1, wherein the cavity is backfilled simultaneously as the cavity is formed.

3. The method of claim 1, wherein the cavity is backfilled with a permeable sandy material which is subsequently rendered impervious by the introduction of at least one fluid reactant into the said backfill material.

4. The method of claim 1, wherein the cavity is formed by means of a rotary cutting tool.

5. The method of claim 1 wherein the backfilling of said cavities involves the use of a substantially sandy filler material which is subsequently rendered impervious by permeating at least a portion of said filler material with at least two chemical solutions which react within the pores of said filler material to develop said liquid impervious wall-like zone.

6. A method of forming a liquid impervious wall-like zone in soil comprising establishing a plurality of cavities by cutting into said soil, removing at least a portion of the soil traversed by the cutting to form said cavities, introducing into said cavities granular material intermixed with an expansive material, and introducing into said cavities a fluid to cause said expansive material to swell as necessary to render said material within the cavity limits substantially impermeable to liquids thereby forming said liquid impervious wall-like zone.

7. The method of claim 6, wherein said expansive material is an hydrocolloid.

8. The method of claim 6, wherein said expansive material contains clay minerals.

9. The method of claim 7 wherein the hydrocolloid contains a guar gum base.

10. The method of claim 6 wherein the expansive material coacts with water from the earth formation to form the substantially liquid impervious wall.

11. The method of forming a liquid impervious wall-like zone within an earth formation comprising establishing a plurality of cavities by cutting into said formation, introducing within the limts of at least a portion of said cavities a substantially sandy wall forming filler material which coacts with liquid permeating into the cavity from the earth formation, to form said liquid impervious wall-like zone.

12. The method of claim 11 wherein the cavity is backfilled with filler material substantially simultaneously as the cavity is formed.

References Cited

UNITED STATES PATENTS

| | | | |
|---|---|---|---|
| 2,791,886 | 5/1957 | Veder | 61—35X |
| 3,082,823 | 3/1963 | Hower | 166—294 |
| 2,065,512 | 12/1936 | Cannon | 61—36UX |
| 2,159,954 | 5/1939 | Powell | 61—36 |
| 2,233,872 | 3/1941 | Proctor | 61—36 |
| 3,097,694 | 7/1963 | Kerver | 166—38X |
| 3,159,976 | 12/1964 | Brandt et al. | 61—36 |
| 3,168,920 | 2/1965 | Barrett | 166—32X |
| 3,359,738 | 12/1967 | Dybalski et al. | 61—36X |
| 416,180 | 12/1889 | Neukirch | 61—36 |
| 2,081,541 | 5/1937 | Joosten | 61—36 |
| 2,158,025 | 5/1939 | Van Hulst | 61—36 |

(Other references on following page)

UNITED STATES PATENTS

| | | | |
|---|---|---|---|
| 2,729,067 | 1/1956 | Patterson | 61—35X |
| 2,757,514 | 8/1956 | Wyatt | 61—1X |
| 2,782,605 | 2/1957 | Wertz et al. | 61—36 |
| 2,920,455 | 1/1960 | Ryser et al. | 61—63X |
| 2,995,457 | 8/1961 | Lyons et al. | 61—36X |
| 3,180,098 | 4/1965 | Spencer | 61—36 |

FOREIGN PATENTS

| | | | |
|---|---|---|---|
| 409,760 | 5/1934 | Great Britain | 61—36 |
| 456,695 | 11/1936 | Great Britain | 61—36 |
| Ad. 23,268 | 1911 | Great Britain | 61—36 |
| 415,326 | 8/1934 | Great Britain | 61—36 |
| 878,964 | 10/1961 | Great Britain | 61—36 |
| 589,367 | 12/1959 | Canada | 61—36UX |

JACOB SHAPIRO, Primary Examiner

U.S. Cl. X.R.

61—1, 11, 53.52, 53.64, 58